United States Patent [19]

Cidon et al.

[11] Patent Number: 4,991,172
[45] Date of Patent: Feb. 5, 1991

[54] DESIGN OF A HIGH SPEED PACKET SWITCHING NODE

[75] Inventors: Israel Cidon, New York, N.Y.; Inder S. Gopal, Fort Lee, N.J.

[73] Assignee: International Business Machines Corporation, Armonk, N.Y.

[21] Appl. No.: 264,402

[22] Filed: Oct. 28, 1988

[51] Int. Cl.⁵ .................................. H04J 3/02
[52] U.S. Cl. ........................ 370/94.100; 370/60; 370/85.9
[58] Field of Search .......... 370/94, 60, 85, 85.7, 370/85.9, 85.11, 85.12, 60.1, 67, 66, 94.1, 94.2, 95.1

[56] References Cited

U.S. PATENT DOCUMENTS

| | | | |
|---|---|---|---|
| 4,542,501 | 9/1985 | Chevalet et al. | 370/85.6 |
| 4,719,621 | 1/1988 | May | 370/60 |
| 4,730,308 | 3/1988 | Friedman et al. | 370/85 |
| 4,750,109 | 6/1988 | Kita | 370/94 |
| 4,815,071 | 3/1989 | Shimizu | 370/60 |
| 4,819,228 | 4/1989 | Baran et al. | 370/85 |
| 4,821,263 | 4/1989 | Lundh | 370/85 |
| 4,823,312 | 4/1989 | Michael et al. | 370/94 |

Primary Examiner—Douglas W. Olms
Assistant Examiner—Alpus H. Hsu
Attorney, Agent, or Firm—Douglas W. Cameron

[57] ABSTRACT

A method of transmitting high speed (1 Gbits/sec), packetized, integrated voice/data through a communications network. This invention, more specifically, deals with the word by word transmission of packets on a parallel transmission bus.

3 Claims, 15 Drawing Sheets

DESIGN OF A HIGH SPEED PACKET SWITCHING NODE

DESCRIPTION

1. Technical Field

This invention relates to a high speed integrated voice/data packet switching node. This invention relates to a method of transmitting voice and data packets through a network having a number of switching nodes. More specifically, this invention relates to a method of transmitting a packet of a parallel transmission bus from the FIFO memory of a source adapter to a FIFO memory of a destination adapter. This invention also relates to resolving contention among a plurality of adapter for access to the parallel transmission bus.

2. Description of the Prior Art

The trend in today's communication systems is to carry data traffic through packet switching techniques and to use circuit switching techniques for voice. Conventional wisdom has argued that the statistical multiplexing offered by packet switching makes it ideally suited to traffic of a bursty nature such as interactive data. For steady streams of traffic such as voice, the nodal processing overheads necessary for each packet overcome any bandwidth savings that statistical multiplexing may achieve, and circuit switching techniques are more appropriate. The conventional wisdom was extensively studied and tested by several studies in the late seventies.

1. D. Cohen, "A protocol for packet switching voice communication," Computer Networks, Vol. 2, pp. 320-331, 1978.
2. C.J. Weinstein and J.W. Forgie, "Experience with speech communication in packet networks," IEEE Journal on Selected Areas in Com., Vol. SAC-1, No. 6, pp. 963-980, Dec. 1983.
3. D. Conrads and P. Kermani, "A feasibility study of using store-and-forward data communication networks to transmit digitized speech," IBM Research Report, RC 9157, Oct. 1981.

Essentially all of these works were unable to show conclusively that packet switching is suitable for voice because they were attempting to use general packet switching techniques (SNA, ARPA) that were developed for the transport of data.

4. J.D. Atkins, "Path control—the network layer of System Network Architecture," in Computer Network Architecture and Protocols, New York: Plenum, 1982, ch. 11.
5. J.M. McQuilliam and D.C. Walden, "The ARPA network design decisions," Computer Networks, Vol. 1, pp. 243-289, 1977.

These techniques use a general purpose processor to do the packet switching in software, and consequently are not able to provide the substantial throughputs necessary for voice.

The first work to realize the true potential of packet switched voice is described in an article by J.S. Turner and L.F. Wyatt entitled, "A Packet Network Architecture for Integrated Services," Globe Comm 1983, pp. 2.1.1-2.1.6. The basic idea of off-loading the packet switching function onto specialized hardware is proposed in this work.

U.S. Pat. No. 4,494,230 to Turner describes a communication method and packet switching system in which packets comprising logical addresses and voice/data information are communicated through the system by packet switching networks which are interconnected by high-speed digital trunks. Turner requires a central processor to distribute to all of the controllers the physical and logical addresses needed to route a packet to its destination. This distribution is done at the time of call set-up. When a packet arrives at an incoming trunk, an address translation and table look up is performed before the packet can be routed through the switching network to the output trunk. Once the packet enters the switching network a self-routing concept is used whereby the packet can be routed to the appropriate output trunk without the need for further table lookups or processing. Thus, this invention requires a call set-up protocol resulting in increased protocol complexity. Also, this invention supports only 1.5 megabit links. Furthermore, this invention uses a multistage switching network requiring a design using custom VLSI chips. U.S. Pat. No. 4,488,289 and 4,491,945 both issued to Turner describe further details of the overall system described in the '230 patent. And hence the above comments are applicable to these two patents. U.S. Pat. No. 4,512,011 issued to Turner is also similar to the '230 patent, but it has superior reliability characteristics which are achieved through duplication of the switching network.

U.S. Pat. No. 4,539,676 to J. Lucas uses circuit switching to transport bulk data and voice while it uses packet switching to transport bursty data. Thus, this patent requires two separate segments: a traditional circuit switch segment and a packet switch segment.

U.S. Pat. No. 4,573,151 to H. Jotwani uses circuit switching to transmit voice, while packet switching is used only to transmit certain supervisory control information from remote line switches to a central office.

U.S. Pat. No. 4,400,587 to Taylor et al. deals with rerouting calls in a call distributive system using only circuit switching networks.

U.S. Pat. No. 4,307,446 to Barton et al. describes a digital network for interconnecting digital devices. This network has 1-22 expenders and 22-1 multiplexers which are connected to form a switching network. Each switching device is capable of controlling only two input ports and one output port or vice versa. The source address is needed for arbitration, and Barton requires that the source address from a particular destination be the destination address from that particular source. Barton also requires that only a single predefined path be used between source and destination. The network described in Barton is not intended to be a generic packet switching network.

Much of the environment in which this invention operates is described in IBM Research Report RC 122771, dated Oct. 30, 1986. This report by I. Cidon, I. Gopal and H. Meleis is entitled: "PARIS: An Approach to Integrated Private Networks".

Thus, there is a need for a simple and cost effective private integrated voice/data packet switching network which is capable of providing nodal throughput in the range of 1 Gbits/sec without using custom VLSI chips. In addition, there is a need for a method of transmitting packets on a parallel transmission bus without the need for call set up.

SUMMARY OF THE INVENTION

It is, therefore, an object of this invention to provide a cost effective high speed (in excess of 1 Gbits/sec)

communications network for transmitting packetized voice and data.

Accordingly, this invention provides a method of transmitting a packet on a parallel communications bus from a FIFO memory of a source adapter to a FIFO memory of a destination adapter. This method provides for transmitting a packet from the FIFO memory of the source adapter with one word being transmitted on the bus during each clock cycle. In addition, all the words of the packet are transmitted in consecutive clock cycles, and the link address of the packet appears in a designated word then, the first and last word of the packet 11 is identified. Accordingly, the link address in the designated word of the packet is compared with each link address in all of the adapters capable of accessing the bus. When the link address in the designated word matches the link address in an adapter, the words of the packet then written in the FIFO memory of the corresponding destination adapters.

This invention also provides for an apparatus for resolving contention among a plurality of adapters for access to a communications bus. This apparatus has a number of cells arranged in a ring formation with the output of a ninth cell being the input of a (i+1)-th. Each cell is also associated with a corresponding adapter. Each cell has a storing means for storing a token and a token transfer logic circuit. The storing means is used to store a token which indicates that an associated adapter has access to the bus. The storage means stores the token when the token has previously had the token stored therein and either there are no requests from any of the adapters for access or there is a request from the corresponding adapter for access to the communications bus. The storage means will also store the token when the token is being transmitted to it and the corresponding adapter has a request to gain access to the communications bus. The token transfer logic circuit is used to transmit the token to one of the cells corresponding to an adapter requesting access to the bus. The circuit transfer means of a given cell will transmit the token if its corresponding adapter has no request to gain access to the communications bus and either the cell has the token being transmitted to it or the cell has the token stored in its storage means. Thus, the token transfer logic circuit of a given cell can transmit the token to another cell without having to wait for a clock pulse, thereby allowing one clock cycle, the token to pass through a number of cells to a cell corresponding to an adapter requesting access to the bus.

This invention also provides for an apparatus for transmitting a token from a given cell to another cell whose corresponding adapter request access to a communications bus, without passing the token through intermediate cells. This apparatus comprises a means for determining whether any adapter corresponding to the intermediate cells has a request to gain access to a communications network. This apparatus also includes a means responsive to the determining means for transmitting the token directly from one cell to another cell without passing the token through intermediate cells whose corresponding adapters have no request to gain access to the communications network.

DESCRIPTION OF THE PREFERRED EMBODIMENT

Figure 1:
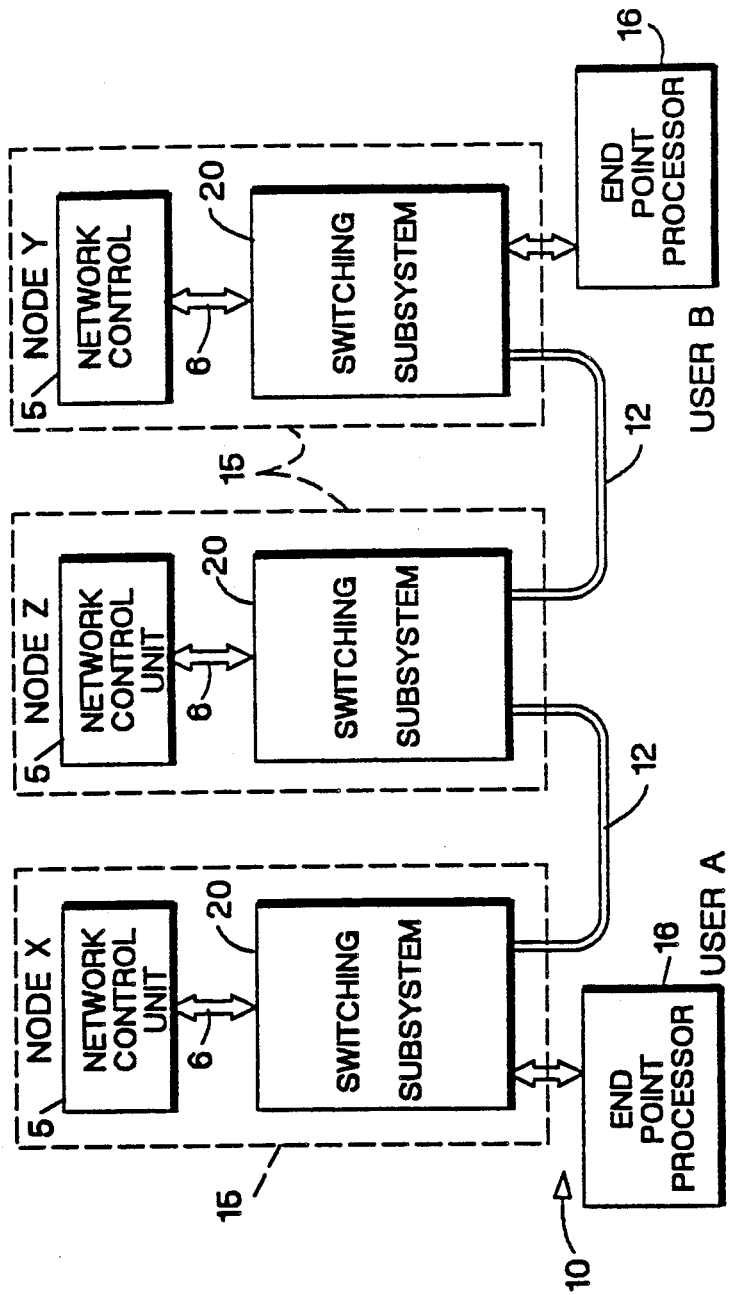
FIG. 1 is a schematic illustration of a communications network having a number of switching nodes.

Shown in FIG. 1 is a schematic illustration of a communication network with three switching nodes 15. The basic components of the network are the network control unit 5, switching subsystem 20, links 12 and the end point processor 17.

Network Control Unit (NCU)

The NCU implements all the functions that are invoked during call setup. In addition it interacts with the other components in gathering information (e.g., traffic statistics) that is needed in performing these functions. It also interacts with the NCU's in other Telecommunications Network Node's (TNN) both in gathering information and, perhaps, in performing the functions themselves. The functions that a NCU performs include the call acceptance function that makes decisions on whether or not to permit a new voice or data call access to the network; the route computation function that determines the path that a call is to be routed over; as well as directory and other application level functions which perform important services such as the location of remote network resources. Many aspects of the NCU protocols and algorithms are similar to the ones described in an article by A. E. Baratz, J. P. Gray, P. E. Green, Jr., J. M. Jaffe and D. P. Pozefsky, entitled, "IEEE Journal on Selected Areas in Com., Vol. SAC- 3, No. 3, pp. 416-426, May 1985. The network control unit can be any general purpose computer such as the IBM PS2.

Switching Subsystem (SS)

Figure 2:
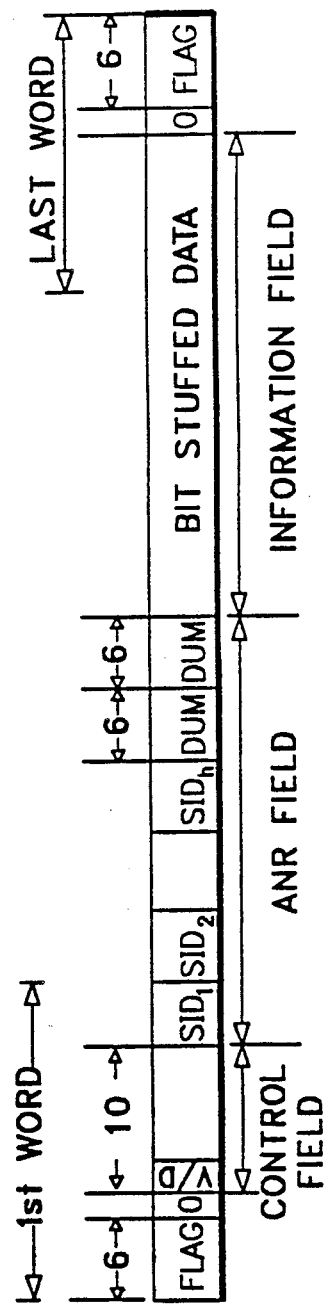
FIG. 2 is a schematic illustration of a packet having an automatic network routing (ANR) field. This field has a series of link addresses. Each link address is schematically illustrated by the letters SID (Switched ID), and in such addresses ($SID_l$ through $SID_n$) are shown in this figure.

The SS performs the intermediate node functions that are involved in the transport of packets (See FIG. 2). These functions include packet framing, packet buffering, determination of the outgoing link, the actual switching function of transferring the packet from the incoming to the outgoing link, congestion control to prevent excessive packet queueing, priority functions. In addition to intermediate node functions, the SS performs statistics gathering to report to the NCU. In discussing the SS in more detail, we shall decompose it into several sub-components; the input and output link adaptors, the monitor that collects traffic statistics, and the switching kernel.

End-Point Processor (EPP)

The EPP is responsible for constructing the packet in the appropriate format and delivering it to the network. This involves inserting the appropriate headers and delimiting flags and performing bit-stuffing and destuffing operations on the information field in order to ensure that the delimiting flags do not occur within it. In addition, the EPP performs the end-to-end functions of flow control, error recovery, and reassembly/playout etc. These end-to-end EPP functions are sensitive to the nature of the traffic that is being transmitted. In other words, the functions for voice may be very different from those for data. Sometimes, where appropriate, the EPP function may be integrated into the link adaptors in the SS. Details of the EPP functions are presented in the article by D. Cohen entitled, "A Protocol for Packet Switching Voice Communication," Computer Networks, Vol. 2, pp 320-331,1978.

A typical voice or data call over this path will proceed in the following fashion. Consider the path depicted in FIG. 1. Assume that user A attached to an EPP that belongs to TNN X wishes to communicate with user B in TNN Y. User A will first interact with the NCU in node X in order to perform a directory search for user B. Once it is found that user B is at node Y, user A will obtain from the NCU a route to node Y. We shall assume that the NCU will provide the complete path and not just the next node. This information will be encoded in a form described in a subsequent section and placed in every packet that is transmitted between A and B. The next step in the process is to open the end-to-end connection. In order to do this the NCU's in the intermediate nodes may be involved. Once the end-to-end connection is established the users will begin exchanging useful information packets. In all the nodes along the path, information packets will pass through the SS with out impacting the NCU. At the end-points, A and B, EPP's will also be involved in the transmission of every information packet.

FIG. 2 describes the structure of a packet used in this invention. The important points are as follows:
1. Leading and trailing delimiters (flags) for defining packet boundaries.
2. A 2 byte control which is largely unused at present except for packet priority level (2 bits), a copy bit which indicates whether the packet should be copied to the NCU in addition to being transferred the outgoing link, and a broadcast bit which cause the packet to be sent on all outgoing links.
3. The Automatic Network Routing (ANR) field which is composed of h link address, each link address being two or more bits in length. (h is the number of hops that the packet has to travel). Each link address represents an outgoing link on the packet's path. We shall give more details on this field later on in the section.
4. The information field which is of variable length. There is a maximum and a minimum size for the information field which depends on the actual implementation. Typically, the maximum is about 4K bytes and the minimum about 8 bytes. The information field also contains headers and trailers that relate to the end-to-end protocols.

Automatic Network Routing (ANR)

As the ANR is a key point of the design, we shall elaborate on the ANR field a little further. As mentioned above, the ANR field is composed of a series of h link addresses. The ith link address in the ANR field defines the outgoing link label of the ith hop along the packet path. The outgoing link label is essentially the internal switch ID or link address (SID) of the outgoing link adaptor. Thus, the packet header contains all the routing information necessary for the routing of the packet within each intermediate node along the path. As the packet progresses through the network the "used" SID's are stripped off, so that the first bits in the ANR field always contain the routing information for the current node. This process is depicted in FIG. 1.

Thus, every node will examine a designated position in the ANR field of the header without having to know of its position in the path. No external table look-ups or processing is necessary, thereby ensuring minimal nodal delay.

In this embodiment, the designated position of the ANR field is chosen to be the first position of the ANR field. The difference is that we are using the header across an entire general topology network rather than within a single node.

The packet can also be considered as being divided up into a number of words. In this particular embodiment each word has 32 bits. This number corresponds to the 32 bit data bus shown in FIG. 4. Thus, when a packet is transmitted on the data bus with one word being translated at a time and with only one packet being transmitted on the data bus at any given time, the designated position containing the link address will always be found in the first word of the packet that is transmitted on the bus. Note in FIG. 2 that the link address ($SID_j$) is the first address found in the first word of the packets.

There are two SID's that are reserved for special use. The reserved SID's are the all zeros SID which is always the SID of the NCU adaptor and the all ones SID which is termed the dummy SID and is always unused. Observe that if the SID's are different lengths, it is important to enforce a prefix condition within a single node. In other words, it is important to ensure that no SID is a prefix of another SID within the same node. This prefix condition must hold for the NCU SID and the dummy SID as well.

The ANR field is terminated by two successive dummy SID's (which are stripped off at the end point.) The reason for this is to ensure that bit errors in the ANR field which may cause the packet to be misdirected do not cause packets to travel around the network for a very long time. After a relatively small number of hops, the dummy SID's will be used to route the packet to a nonexistent link adaptor, causing the packet to be discarded.

For simplicity reasons in our prototype we are using fixed length SID of a single byte. Four of these bits are used for addressing the actual outgoing link. The other four bits are used for selective copy and broadcast mechanisms.

Figure 3:
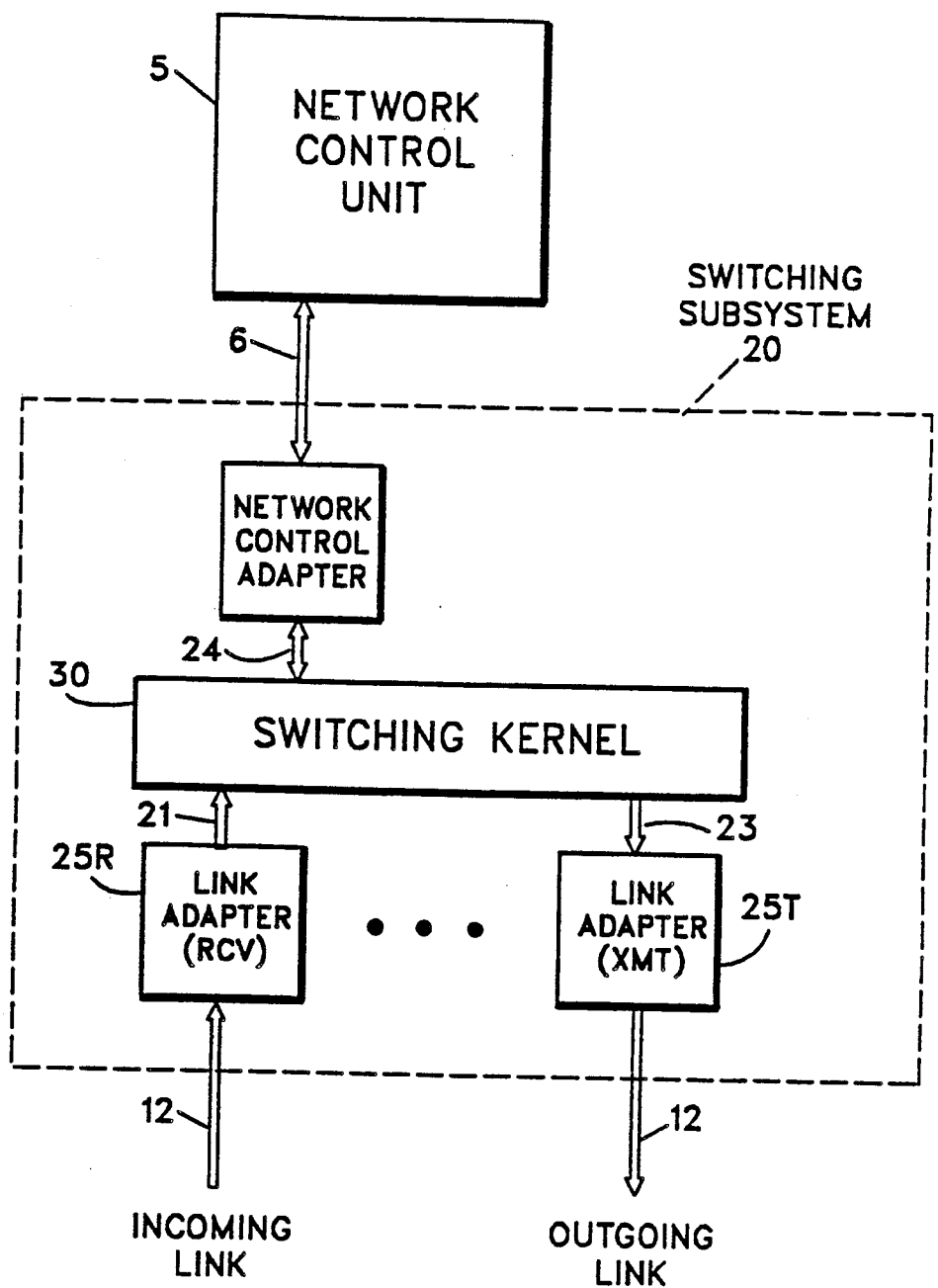
FIG. 3 is a schematic illustration of the switching subsystem.

FIG. 3 is a schematic illustration of the switching subsystem 20 of FIG. 1. Shown in FIG. 3 is switching kernel 30, control unit 5, network control adapter 22, link adapter (receiver) 25R, and the link adapter transmit 25T. The term "adapter" will be used to refer to either link adapter transmit or the link adapter receive. Also shown are busses 21 and 23, along with links 12 as shown in FIG. 1. Bus 24 between the network control adapter and switching kernel is also shown.

1. The Switching Kernel (SK) 30 which performs the basic switching function of transferring packets from source to destination. The SK is based upon a 32 bit parallel bus. However, for example, a 16-64 bit, or higher, parallel bus could be used. Transfer of data over the bus is synchronized by a bus clock operating typically between 20 and 50 MHz. In addition to the bus there is a contention resolution unit (CRU) which determines who can send information over the bus.

2. The link adapters 25T & R that are each comprised of a receive part and a transmit part. The receive link adapters receive incoming packets from the link and send them through the switching kernel. The transmit link adapters receive packets from the SK, buffer them as necessary, and transmit them over the outgoing link. The adapters have clocks that run at the speed of the links (link clocks). Some of the logic in the adapters runs at the speed of the speed of the links and some at the speed of the switch.

There are two basic motivations behind the design:
1. To minimize the transmit time for a packet through an intermediate node.
2. To achieve the above goal with minimal hardware complexity.

There are some key aspects, unique to our design, that enable us to achieve our goals. We shall elaborate on these aspects further as we follow through a packet transfer from incoming to outgoing link.

A packet arrives at the receive adapter as a high speed serial bit stream. The receive adapter first has the job of recognizing the packet, performing a serial to parallel transfer, and storing it into its incoming buffers. In order to minimize the intermediate node processing while preserving bit transparency, we have adopted an end-to-end bit stuffing protocol. Thus, rather than performing the bit stuffing and destuffing on every hop, as in conventional link protocols such as HDLC, we perform it once on an end-to-end basis. The stuffing is done only in the information field. The header fields are to be used in the intermediate nodes and therefore cannot be bit-stuffed end-to-end. Thus we enforce a structure on the header, which ensures that this portion of the packet does not contain any flags, and therefore need not be bit-stuffed and can be used by the intermediate nodes directly. The logic at the receiver adapter is therefore relatively simple. Once the receiver has stored a complete packet, it signals the CRU that it wishes to gain control of the bus. "Control of the bus" might be referred to as "access to the bus". When an adapter gains access to the bus, it can then transmit packets stored in its buffer on the bus. The method by which the CRU assigns control to the receivers is another significantly new aspect of the design. (From the CRU's viewpoint the receivers are "sources" and the transmitters "destinations"). We resolve contention through a round-robin, token passing type of scheme. There is a single token and the source that obtains the token has the right to send a packet on the bus. The token is passed from source to source in a logical ring. The major difference between our scheme and that employed in token ring LAN's is that we pass the token only to sources that have a packet to transmit and the token passing is done in constant time (not in time proportional to the number of sources). This constant time is of the order of a few clock cycles of the bus clock. The speed of the token passing minimizes any wastage of bus bandwidth. In a subsequent section, we give techniques whereby the token passing can be accomplished even faster. Another important way in which we minimize bus bandwidth wastage, is by employing parallelism in the packet transmission and the transfer of control. In other words, while a source is sending its packet, we transfer the token to the next source with a packet to send. In this way, assuming a packet takes more than the token passing time to send, no wastage of bus bandwidth is incurred.

The round-robin operation of the CRU has an additional benefit. It is inherently fair as it guarantees every source access to the bus within a bounded time. Together with a bound on the bit rate of the incoming links, this is adequate to guarantee no buffer overflows at the receive adapter even with a small amount of buffering.

Once the source has obtained control of the bus, it retains control for the duration that it takes to complete sending one or more complete packets. The packets are sent in the form of words, each word consisting of as many bits as the bus width, with one word being sent per bus clock cycle. This transmission of a packet as a complete entity has the basic advantage of eliminating contention at the destination. In other words, a destination will receive only one packet at a time, and does not have to consider the possibility of simultaneously receiving packets from two separate sources. This, simplifies considerable the design of the destination (transmit adapter).

There are two special wired-OR lines (See 32 of FIG. 4) that are used for control. The first is a line that indicates End of Packet (EOP). When a source is transmitting a packet this line is lowered. When the source transmits the last word of a packet, it raises this EOP line which remains high till another packet is transmitted. The EOP line is used to inform the destination adapters of the first word in a new packet. The other line indicates End of Transmission (EOT). This line is raised when the source is transmitting the last word of its last packet. The EOT is a trigger to the source that has control of the token that it can begin to transmit its packet. In the following clock cycle, this source transmits the first word of the packet and lowers the EOT line. Notice that every clock cycle is being used to transmit useful information.

A destination performs in the following fashion. Whenever it senses the wired-OR EOP line being lowered, indicating the first word (See FIG. 2) of a new packet, it looks at the lines on the shared bus that correspond to the bit positions that carry the current SID in the ANR field. Essentially these will be the bits that immediately follow the control field. Note that each adapter will examine a different number of lines, depending on the size of its SID. If a match is found with its SID, it opens its incoming FIFO buffers, and copies from the data bus the successive words of the packet. When the last word of a packet is transmitted, the End of Packet (EOP) is raised, and the destination stops copying.

In order to guarantee low delay for certain classes of traffic we provide two levels of priority. This is accomplished through two separate FIFO buffers at each destination, one for each priority level. Depending on the priority bits in the header of the packet, the packet is placed into one or the other buffer. Once a complete packet has been collected, the destination begins reading out the contents of the FIFO buffer and transmitting it over the outgoing link. A non-preemptive priority is accomplished, whereby the data FIFO is read from only if the voice FIFO is empty.

Before actually transmitting the packet over the link, the transmission adapter has to perform a couple of extra tasks. Firstly, in order to ensure that the SID for the next hop is at the right bit position in the packet, the current SID has to be removed. Secondly, packet start and termination delimiters have to be reconstructed. Finally, a parallel to serial conversion has to be performed.

We have completed tracing the packet path through the switching kernel. Control packets that are destined to the NCU, travel in a similar fashion except that the destination address is the network control address, i.e. "000000".

The monitor is the last, but by no means the least important part of our design. In the aforementioned reference by D. Cohen, methods are discussed whereby routing is modified based upon measurement of link loading. The monitor provides a simple, efficient way to gather such measurements. As the switch is based upon a shared bus, a single monitor that "observes" the traffic over the bus can derive all information about the status of all its outbound links, including average link loading, packet queue lengths etc.

Figure 4:
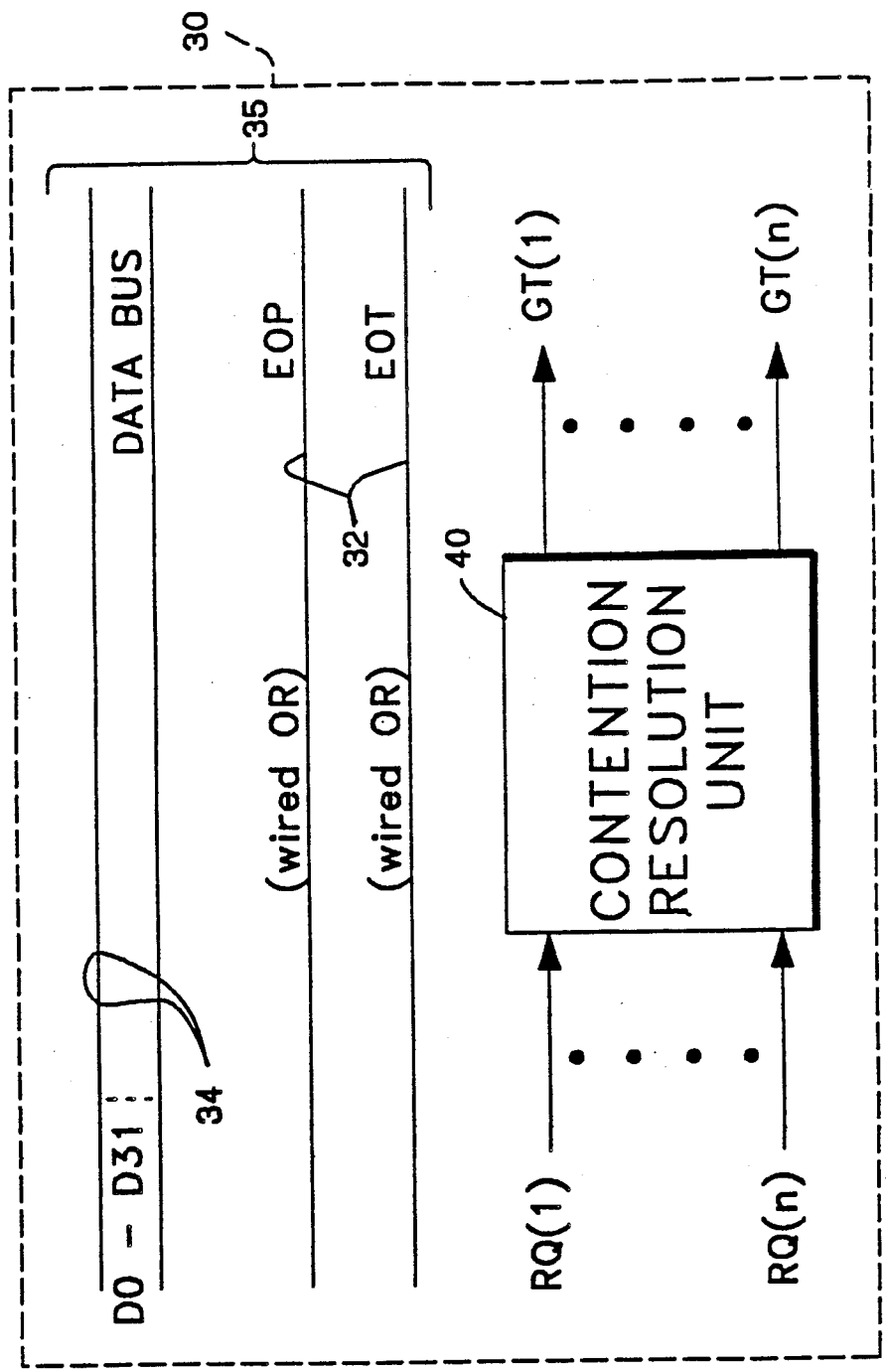
FIG. 4 is a schematic illustration of the switching kernel.

The basic structure of the switching kernel is schematically illustrated in FIG. 4. It is composed of a parallel data bus 34, a control bus 32, and a contention resolution unit (CRU) 40. The details of the CRU will be described later in this section. The data bus carries words of information transferred from the source to the destination. The width of the data bus can vary from node to node and defines the basic word width in the system. Typical values are 16, 32 and 64 lines. We choose 32 as a typical number. Also shown in FIG. 4 are the request lines RQ (1)–RQ (n) and grant lines GT (1)–GT (n) for handshaking between the contention resolution unit and the adapters.

As discussed in the previous section, at any time only one adapter can get control over the bus, and it keeps the control for a duration of one or more full packet transfers. The adapter which currently controls the bus is called the current bus master. The transfer of data over the bus is synchronized by a common bus clock, i.e. a single bus clock cycle defines a time slot which corresponds to a basic word transfer through the bus. A full packet transfer takes a variable number of time slots depending on the packet length.

Recall that the addressing of packets transferred through the data bus is accomplished using the SID's in the packet. The first word of each packet contains the currently used SID in a fixed bit location. This SID identifies the destination adapter to which the packet should be forwarded. The SID is latched by each adapter and compared with its own identity. Whenever a match occurs at some adapter, it considers itself as the packet's destination and receives the packet, word by word, from the data bus. Note that no more than one packet may concurrently be received by any destination node. Consequently, there is no need to identify the source identity for the destination.

While a packet transfer is in progress all other adapters (except the current bus master) which have packets ready to transmit (we refer to them as active sources) compete for getting control over the bus for the next packet transfer. The control bus and the contention resolution unit are the means by which the next bus master is selected from the set of active sources. The CRU uses a round robin scheme for this selection resulting in a "fair" allocation of the sources and a limited amount of buffers needed at the sources.

Each adapter has a unique output request line (RQ) and a unique grant line (GT) for handshaking with the CRU. The request line signals the CRU that the source is active and requests the control for the next packet transfer. The CRU selects one of the adapters as the next bus master by activating the corresponding grant line. The selection is a function of the current bus master's identity and the state of the request lines. In addition, a common wired-OR line, end of transmission (EOT), is used to signal the next bus master that the current bus master has completed its packet transfers. In the following bus clock cycle, the next bus master becomes the current bus master and starts its packet transfers. Note that the transfer of data and the contention resolution process are performed in parallel so that typically the next bus master is selected before the current bus master completes its packet transfers. This results in a full utilization of the data bus when the system is heavily loaded. It also imposes less rigorous speed demands from the contention resolution unit. To clarify the exact process of the next bus master selection we describe the algorithm performed by an active source.

Active Source Algorithm

1. Activate RQ line
2. Wait for GT
3. If EOT: transmit packet, negate RQ line.
4. Last word of last packet—activate EOT

Details of the Contention Resolution Unit

The structure of the CRU is a basically a trade off between the complexity of the hardware and the speed requirement. The speed requirement is relaxed due to the parallelism of the operations. The selection of the next bus master should be completed before the end of transmission of the current bus master have reached i.e. faster then the transferring of the shortest possible packet through the data bus. Typically this is several clock cycles of the bus clock. Consequently, we allow the CRU to operate using a slower clock which is a division of the common bus clock. Note that a having a faster CRU is always an advantage since it decreases the delay in a lightly loaded systems (where parallelism between transfer of packets and transfer of control may not always be possible).

Figure 5:
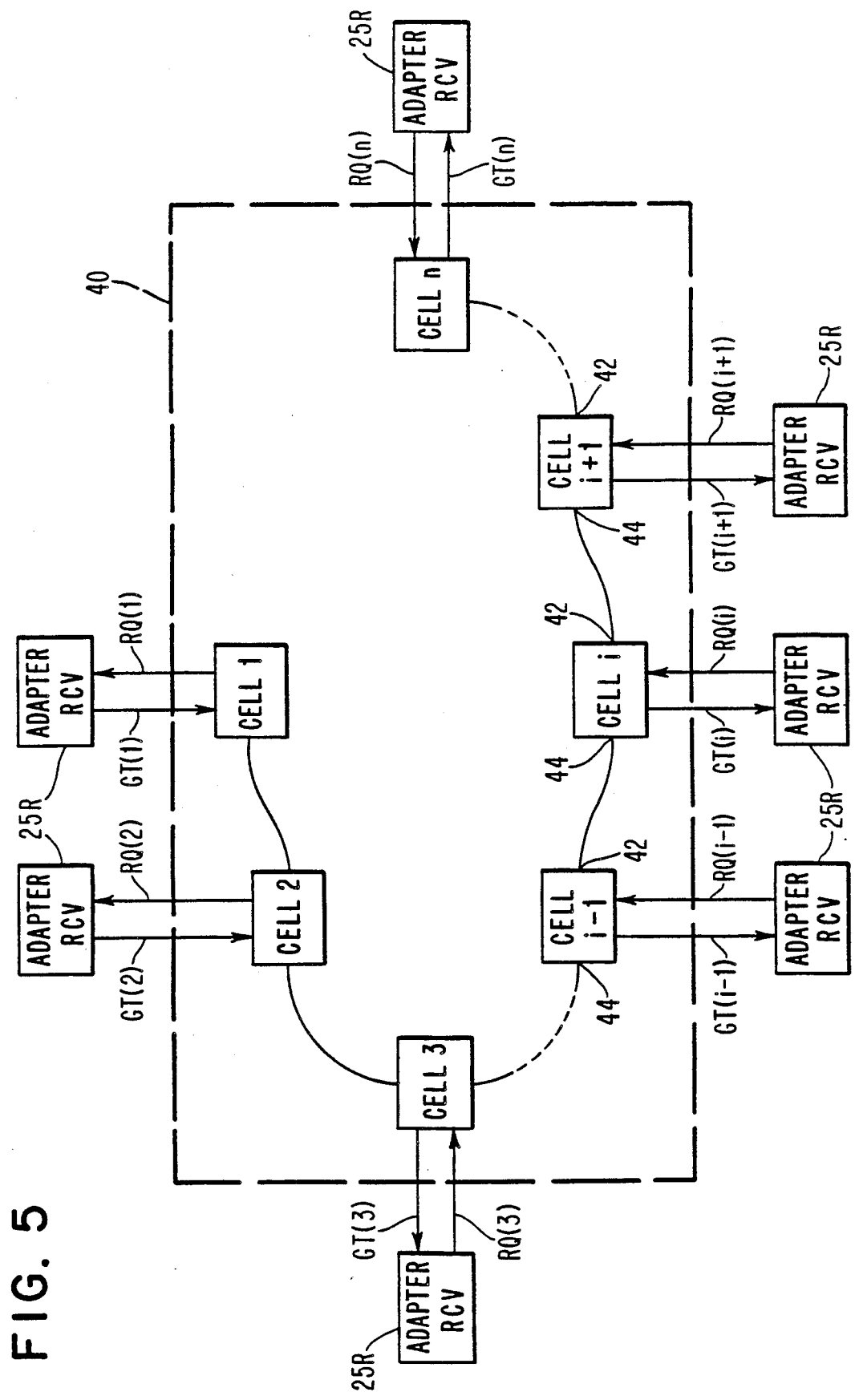
FIG. 5 is a schematic illustration of the contention resolution unit.

Shown in FIG. 5 is a schematic illustration of the contention resolution units. Shown is a plurality of cells arranged in a ring formation with the output of each i-th cell 42 being the input 44 of the (i+1)-th. Shown also are the receive adapters 25R corresponding to each cell along with the respective grant lines GT and quest lines RQ.

Figure 6:
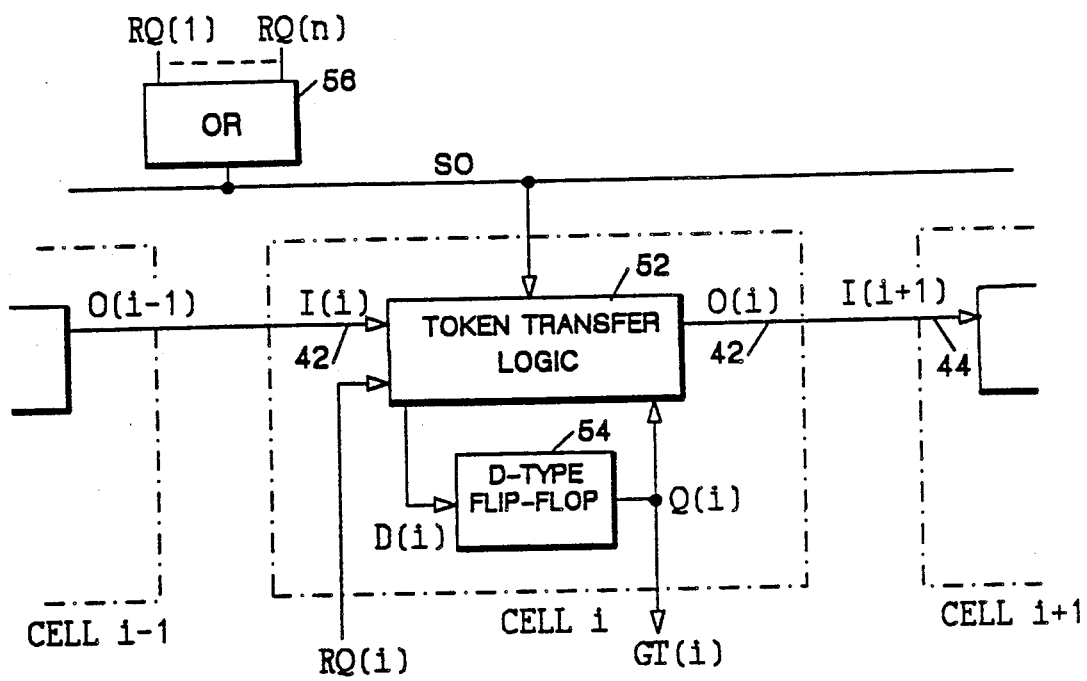
FIG. 6 is a schematic illustration of a cell used for storing and transmitting the token around a ring.

The token transfer circuit (hereinafter also referred to as a cell) is depicted in FIG. 6. Here a group of cyclically connected identical cells, each corresponds to an adapter, is depicted. The components depicted in the figure are all standard. The TOKEN TRANSFER LOGIC circuit 52 is implemented in a PAL and performs the logic operation described below. The other components are standard gates. Each cell consists of a storage means (more specifically a D flip-flop 54), the token transfer logic circuit 52, and lines (input lines 42 and output lines 44) which connects the cell to its neighbors in the cycle and to its adapter (see 25R of FIG. 5). The logic updates the output lines 44 and the contents of the D flip-flop according to the contents of the input lines 42 and the state of the flip-flop. The logic performs the following Boolean operations.

$$O_i = Q_i\, SO\, \overline{RQ_i} + \overline{Q_i}\, I_i\, \overline{RQ_i}$$

$$D_i = Q_i\, RQ_i + Q_i \overline{SO} + I_i\, RQ_i$$

In the above expression, $I_i$ represents the input to cell i, $O_i$ is the output line, $D_i$ is the next state input of the D flip-flop, $Q_i$ is the current state of the D flip-flop, and $RQ_i$ is the request line. SO is an additional line which carries the output of an ORgate 56 indicating that at least one adapter has requested the bus in the current clock cycle.

The token is represented by the state of the D flip-flop. The current bus master is the only cell with the D flip-flop set to '1'. When the SO line is high (some other adapter wishes to get control of the bus) and its own RQ line is inactive, this cell sets the output line 0 to '1'. This corresponds to the passing of the token to the next active source. The cell then sets the next state of its flip-flop to '0', signifying that it has passed the token. The token is immediately passed through all the non-active cell as they simply transfer their inputs I to their outputs 0. The token is stopped when it reaches the next active cell in the cycle. Each active cell always set its output to 0. Whenever an active cell receives '1' in its input line I it sets its flip-flop to '1' in the next clock cycle. This indicates that it has received the token and is the next bus master. This cell will hold its RQ line active until it starts the packet transfer, and then will release this line to allow the rest of the adapters to compete for the new packet transfer.

The token transfer will take as much time as the sum of the token transfer logic propagation delay within the non-active cells. Each cell causes approximately a 2 gate delay. If the token logic clock runs at a fraction of the speed of the bus clock, there is enough time for the token to be passed in one token logic clock cycle.

Figure 7:
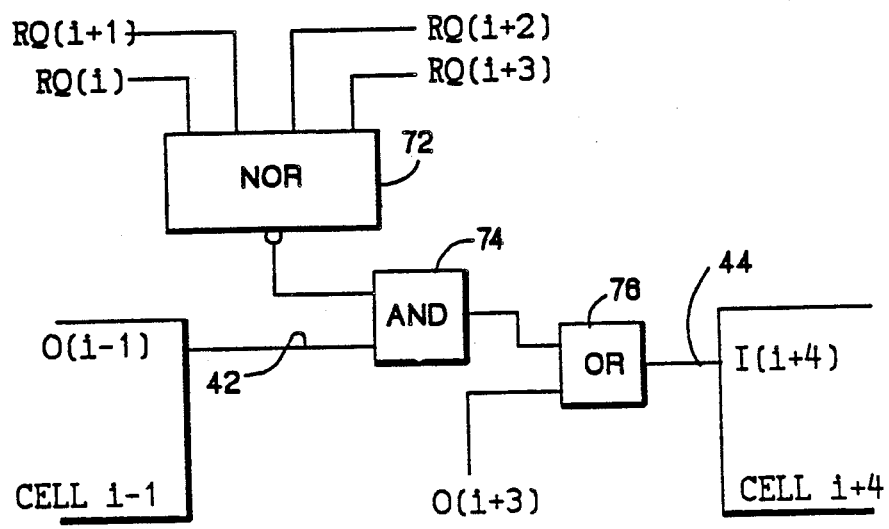
FIG. 7 is a schematic illustration of a token bypassing network for passing a token directly from one cell to another cell bypassing intermediate cells whose corresponding adapters have no request to gain access to the communications network.

The token transfer circuit can be extended to allow a large number of adapters and its complexity growth only linearly with the number of adapters. However its propagation delay also increases linearly with this number. To speed up the token transfer circuit a look-ahead logic may be added as shown in FIG. 7. This apparatus allows a token to be transmitted from one cell, say cell i−1, to another cell, say cell i+4, bypassing intermediate cells whose associated adapters do not have a request to gain access to the network. Shown in FIG. 7 is a NORgate 72 with the request lines of intermediate cells (that is, cells i through i+3) which may be by-passed. Shown also is ANDgate 74 having the output line of cell i−1 and the output of NORgate 72 as its inputs. Also shown in ORgate 76 having the output of ANDgate 74 and one of the intermediate cells, say cell i+3, as its inputs. The output of ORgate 76 is then the input of cell i+4. This circuit allows a token to be passed directly from cell i−1 to i+1 if the NORgate indicates that no intermediate cell has a request from its associated adapter to gain access to the network.

The components are standard off-the-shelf gates. The principle of the look ahead logic is to eliminate the propagation delay in these section of the cycle which contains no active cells. In the figure we demonstrate how to short a group of 4 cells in order to reduce the propagation delay. This look ahead logic may be also extended to multiple levels as well.

The Link Adapter

Figure 8:
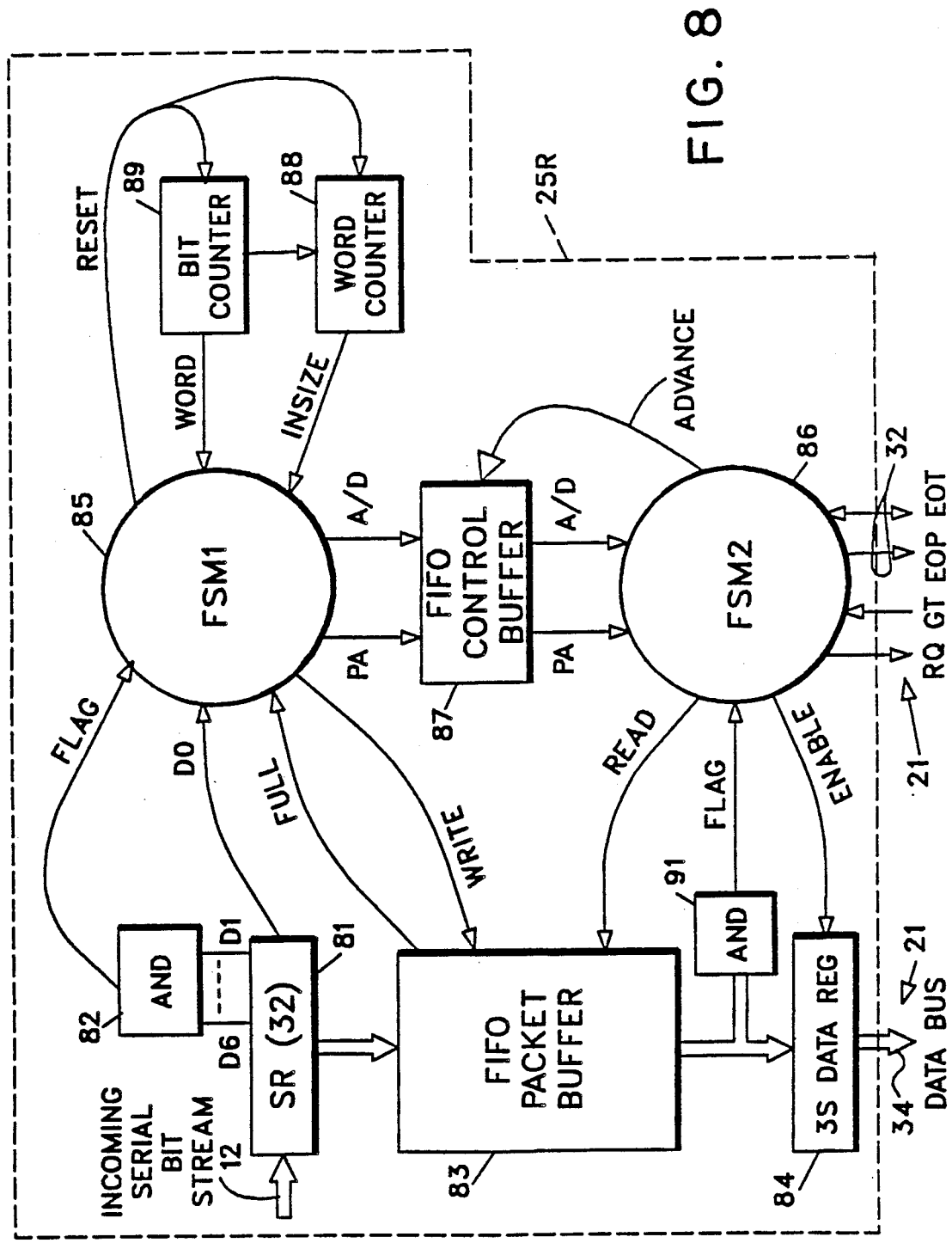
FIG. 8 is a schematic illustration of a receiver adapter, or otherwise simply referred to as a receiver or an adapter.
Figure 9:
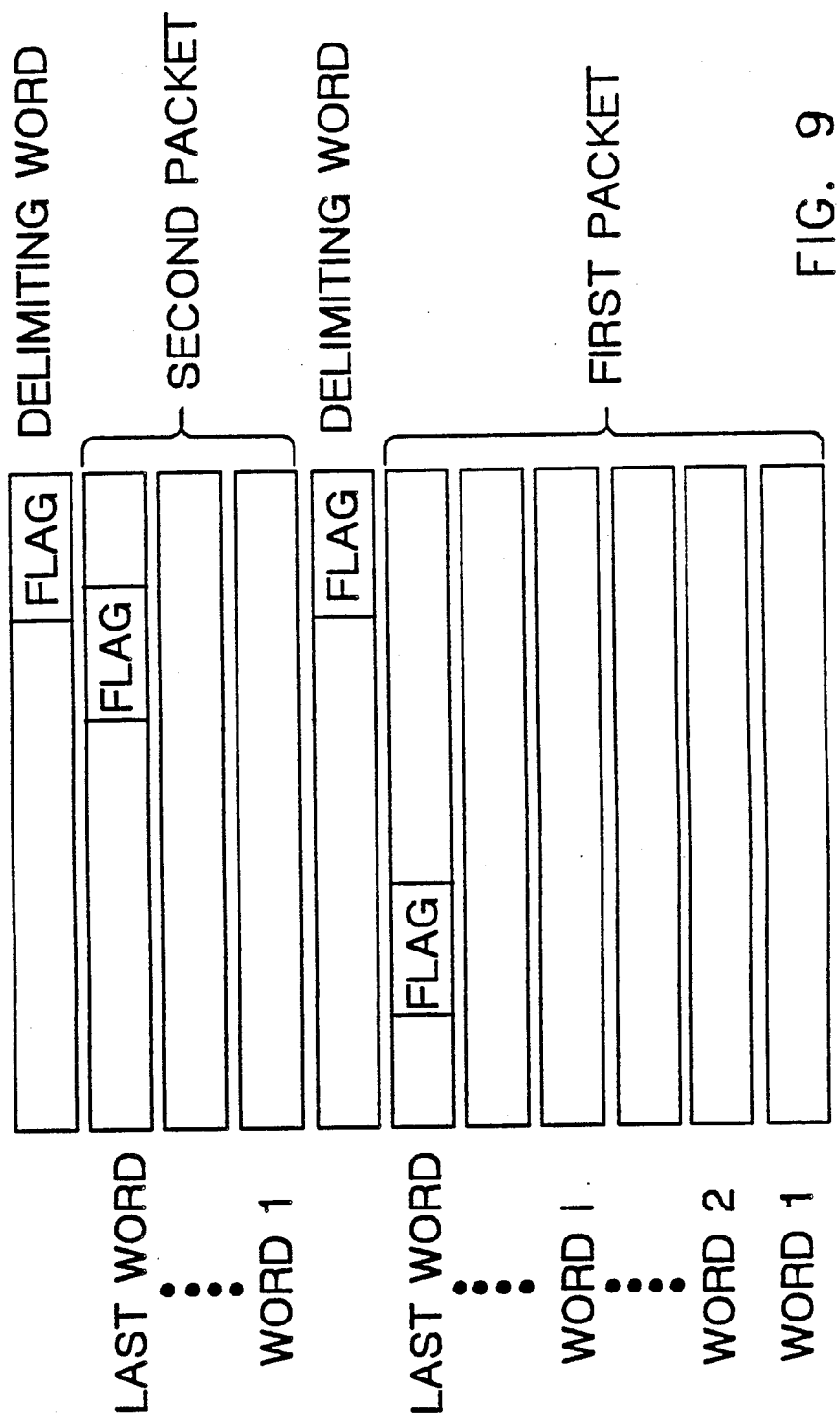
FIG. 9 is a schematic illustration of packets in the receiver buffer of the receiver adapter.
Figure 10:
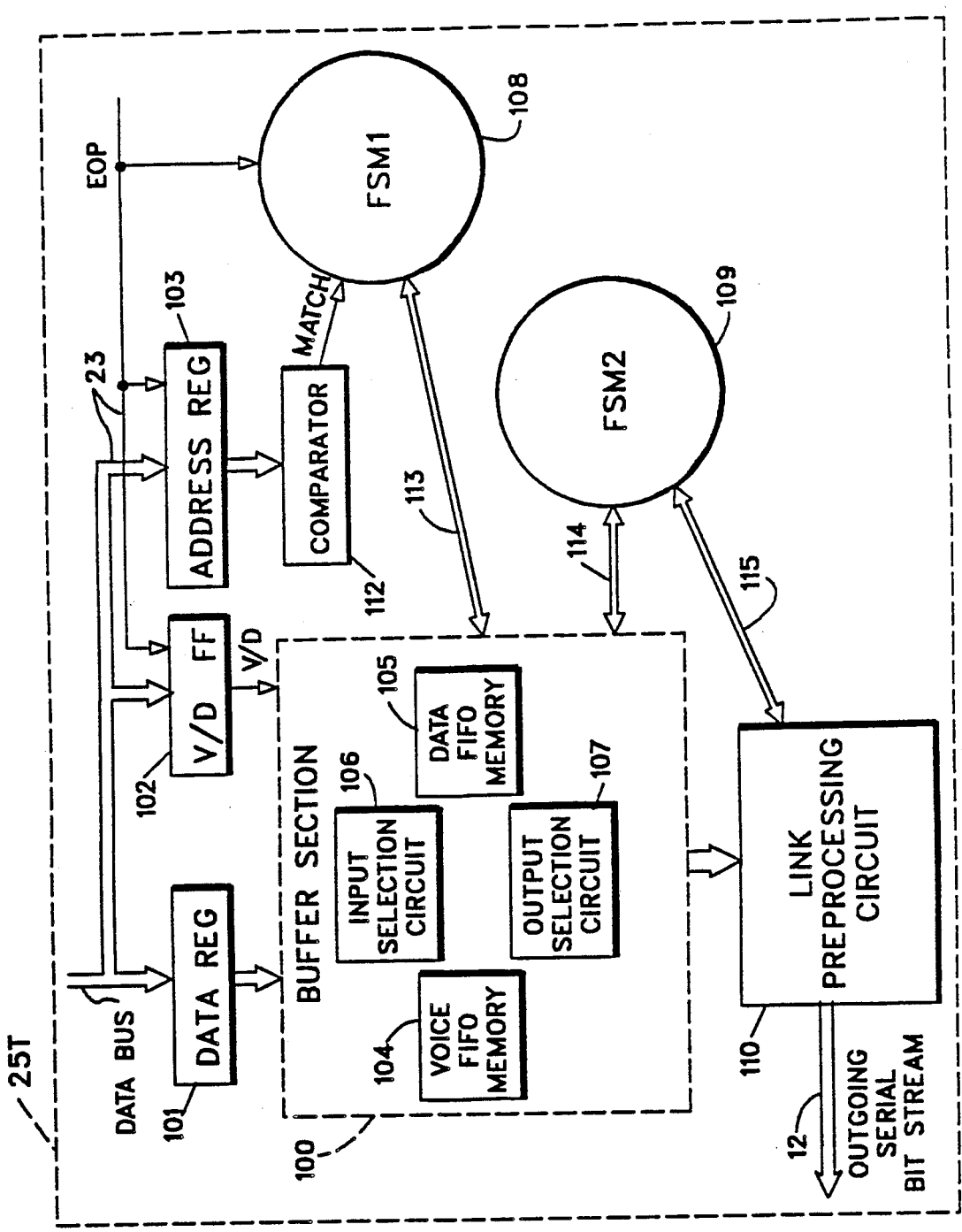
FIG. 10 is a schematic illustration of the transmitter adapter, or otherwise simply referred to as the transmitter or adapter.

Referring now to FIGS. 8-12, the link adapter is composed of two completely independent parts the receiver 25R and the transmitter (See 25T of FIG. 10). Hereinafter, the term "adapter" will refer to either the combination of the receiver and transmitter or to the receiver itself or the transmitter itself. The term "source adapter" will refer to the adapter that is transmitting on the bus while the term "destination adapter" will refer to an adapter that is receiving packets from the buss (See 34 of FIG. 4). As described in the SS overview, the receiver (see FIG. 8) is responsible for handling the data stream received serially over the physical incoming link (see 12 of FIG. 1). It (see FIG. 8) delimits the packets, performs a serial to parallel conversion and stores the packet as 32 bit words into its buffer. Whenever a full packet is stored, the receiver performs the necessary handshaking with the switching kernel in order to become a bus master. After getting the control, it transfers all the packets in its buffer 83 word by word to the data bus. The receiver also recovers from some errors in this process resulted from bit errors in the received data stream.

The transmitter (see FIGS. 10-12) is responsible for forwarding packets to the outgoing physical link (see 12 of FIG. 10). The transmitter detects the packets destined to it (using the SID) over the data bus (see 23 of FIG. 10), separates them according to their priority (namely voice and data), and stores them in its buffers (see 104 and 105 of FIG. 10). The data bus 23 of FIG. 10 is part of the data bus 34 and the control bus 32 of FIG. 4. Whenever some packets are completely received, the transmitter chooses one of them according to the priority and first come first served policies and starts transmitting it as a serial bit stream over the physical outgoing link. It also removes the already used SID part from this bit stream. The transmitter also recovers from errors possible in this procedure, namely, buffer overflows.

The Receiver

The structure of the receiver is schematically illustrated in FIG. 8. The major parts of the receiver are the incoming shift register 81 with the flag detection logic 82, the buffer section 83 and 87, the output tristate data register 84 and two finite state control units FSM1 85 and FSM2 86. All shift registers, tristate registers, logic components are made of standard off-the-shelf components. Basically, FSM1 detects packet boundaries in the incoming bit stream, and stores the received packets into the memory module. FSM2 gets the packets from the memory module and transfers them to the data bus (see 34 of FIG. 4) after performing the necessary handshaking with the switching kernel. Both FSM's are implemented in a standard PAL. The state transition diagram of these FSM's is provided in FIGS. 13–16. The buffer section consists of a large piece of FIFO memory 83 for storing packets (the packet buffer) and a smaller FIFO control buffer 87 for the communication between FSM1 and FSM2. The FIFO's are standard off-the-shelf FIFO memory chips with asynchronous read/write capability. The larger FIFO is 32 bits wide (the width of the data bus), and has to be large enough to contain at least four maximum length packets. The smaller FIFO is two bits wide and must be able to contain as many words as there can be minimum sized packets in the larger FIFO. In practice, it is sometimes preferable to replace the large portion of the FIFO memory with a random access memory. However since the using of FIFO memory facilitates the description, and large FIFO memories are commercially available, we will assume at this point that such a memory is used. Also shown in FIG. 8 are word counter 88 and bit counter 89 which are used to identify word boundaries in the packet.

In the following we explain the operation of FSM1. Let's assume that for a long time no packet was received and FSM1 is waiting for a new packet. The incoming bit stream is constantly shifted into the incoming shift register. The first 6 bits of this register are logically AND in order to detect the existence of a flag. A flag signifies the start of a sequence of ones that separates two consecutive packets. Upon detection of a flag, FSM1 waits for the start of a new packet. The signal of this event is the detection of the first zero at the output $D_0$ after the flag. When this occurs, the first word of the new packet is stored into the memory. At the same time the bit and word counters are reset. From this point as long as no new flag is detected, FSM1 stores a new word each 32 link clock cycles. (Recall that 32 bits is the typical value chosen to represent the word width). Whenever a flag is detected this indicates to FSM1 the end of the current packet. In order to distinguish in memory between different packets, a word which consists of a flag (6 sequential ones) in its most right part is stored after the last word of each packet. To accomplish that, whenever a flag is detected which signs the end of a packet, FSM1 stores the contest of SR (which includes this flag at its rightmost position) in memory. At the same time, FSM1 writes into the control buffer the packet arrived (PA) and the packet accept/discard (A/D) flags indicating to FSM2 that an additional packet is completely received and should be transferred or discarded. The A/D flag is updated according to the resultant word length of the packet counted using the word counter. FSM1 sets the A/D flag to one if the size of the packet was found to be of a correct value (i.e. between the lower and upper bounds on packet length), indicating that this packet should be forwarded to the switching kernel. Otherwise, the A/D flag is set to zero. At this point FSM1 goes back to look for a new packet.

The lower and upper bounds on packet size are necessary in order to avoid unnecessary performance degradation when bit errors cause a packet to get fragmented into multiple small packets, or two or more packets to be merged into a much larger packet. We note that while the A/D flag is based here solely on the packet length count, it may be set based on other criterion as well. In particular, some form of real time error checking may be used to detect bit errors and discard the packet before it enters the SK.

We now describe the operation of FSM2. FSM2 starts its operation whenever the PA flag in the control buffer indicates that a full packet is completely stored in the FIFO memory. If the A/D flag indicates that the packet should be transferred, FSM2 starts performing the handshaking with the switching kernel by activating its RQ line. Whenever FSM2 detects that both EOT and GR lines are active it negates the wired OR EOT line and the request line and starts transferring words to the data bus. This is done by reading words from memory and enabling the 3 state register. FSM1 also advance the FIFO control buffer to its next location. When a flag is detected (which means that the separating word between packets is read), FSM1 test the contents of the FIFO control buffer. If there is another packet to be transferred, FSM2 advance the control buffer and continues to transfer this packet. The transmission of packets terminates whenever a flag is detected and the control buffer indicates that there is no additional packet in memory or that the next packet should be discarded. In such an event FSM1 transfers the last word (containing the flag) to the data bus and activates the EOT line. Whenever a packet should be discarded, FSM2 just keeps reading the FIFO memory until a flag is detected. In this case the 3 states register remains disabled.

Shown in FIG. 9 is the division of a packet into words in the memory. In FIGS. 13–16, the state diagrams of FSM1 and FSM2 are shown.

Shown in FIG. 10 is a schematic illustration of the transmitter adapter, also referred to as simply the transmitter. The major parts of the transmitter are the input latches composed of the data register 101, the V/D flip-flop 102 and the address register 103, the buffer section 100 composed of a voice and data queues 104 and 105 and the selection circuits 106 and 107, two finite state control circuits FSM1 108 and FSM2 109, the output shift register 110 and the link multiplexer 110. The output shift register and the link multiplexer are both part of the link processing circuit 110 shown in FIG. 10. The link processor is shown in greater detail in FIG. 12. Also shown in FIG. 10, are busses 113–115 and comparator 112. All components are standard off-the-shelf devices. The operation of the transmitter will be described below.

Figure 11:
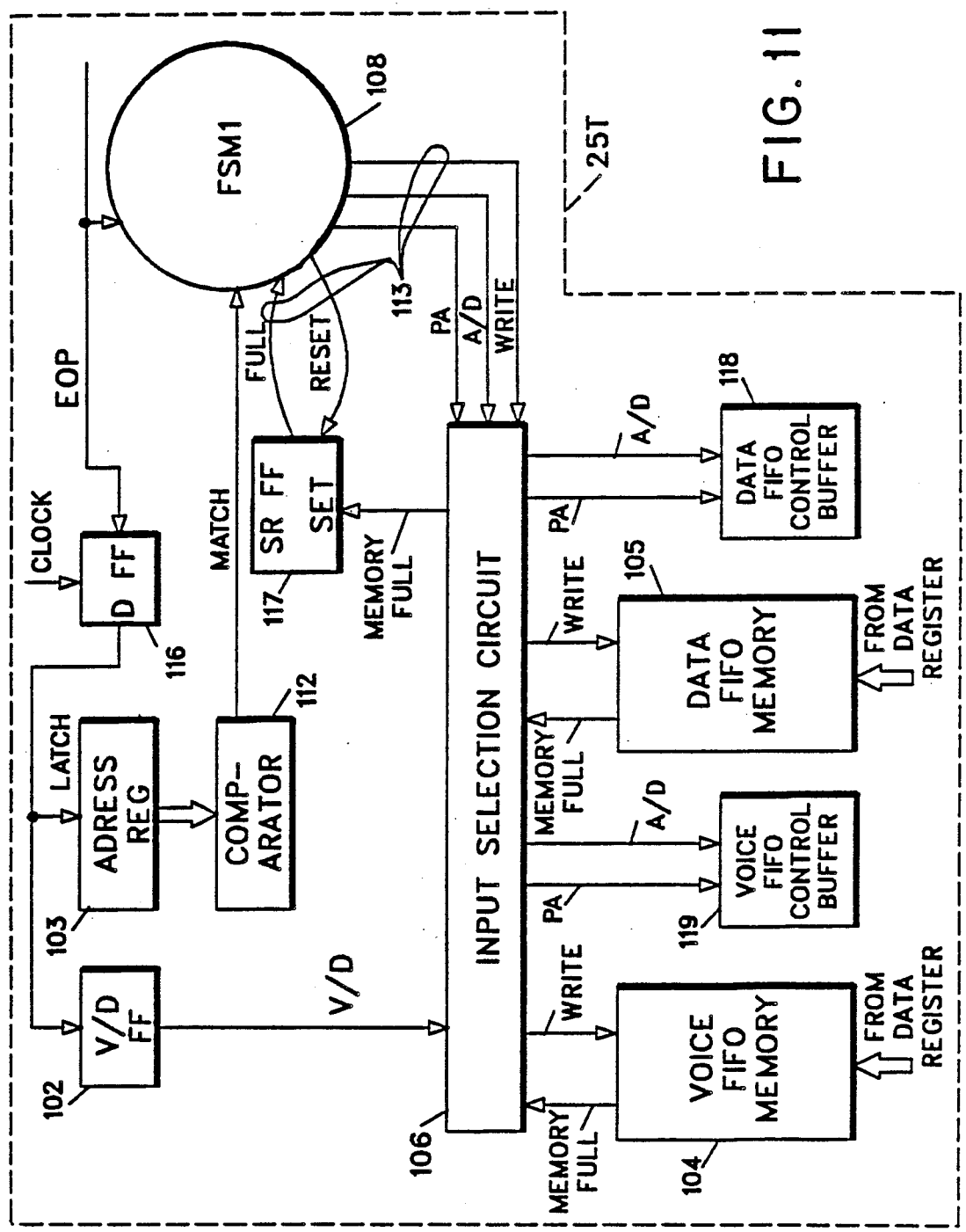
FIG. 11 is a more detailed schematic illustration of the transmitter adapter relating to finite state control circuit FSM1.

In FIG. 11 more details of the portions of the transmitter that relate to FSM1 are shown. FSM1 108 is implemented in a standard PAL. The V/D flip-flop 102 looks at the first bit in the control field, while the address latch 103 looks at the first few bits that follow the control field. As SID's (also referred to as link addresses) are of different length, the address latch in each transmit adapter may look at a different number of bits. In each clock cycle (the bus clock) a new data word is latched into the data register (see 101 of FIG. 10). The address register 103 and the V/D flip-flop 116 is latched only in the first clock cycle after the lowering of the EOP line. Recall that this wired-OR line is raised when a receive adapter transmits the last word of a packet and is lowered only when the first word of the next packet is sent over the Switching Kernel. The V/D bit is used in to set the input selection circuit 106 to select between the voice FIFO memory 104 and the data FIFO memory 105 as the target of this packet. The contents of the address register is compared to the adapter's SID by comparator 112. The output of this comparison—the match line, is fed into FSM1. Whenever a match occurs FSMI starts storing the packet, word by word, into the relevant FIFO memory 104 or 105 (selected by the input selection circuit). When EOP is detected FSM1 writes into the selected FIFO control buffer 117 or 118, the packet arrived (PA) and accept/discard (A/D) flags (in this case both are one). This tells FSM2 that the packet was correctly received and should be transmitted over the outgoing link. If, before the activation of the EOP, the FIFO memory becomes full, then FSM1 waits for the EOP signal, stores the last word in memory (which contains the flag), sets the PA flag to one and sets the S/D flag to zero in the appropriate control buffer. This tells FSM2 that the packet is corrupted due to buffer overflow, and consequently should be discarded.

Figure 12:
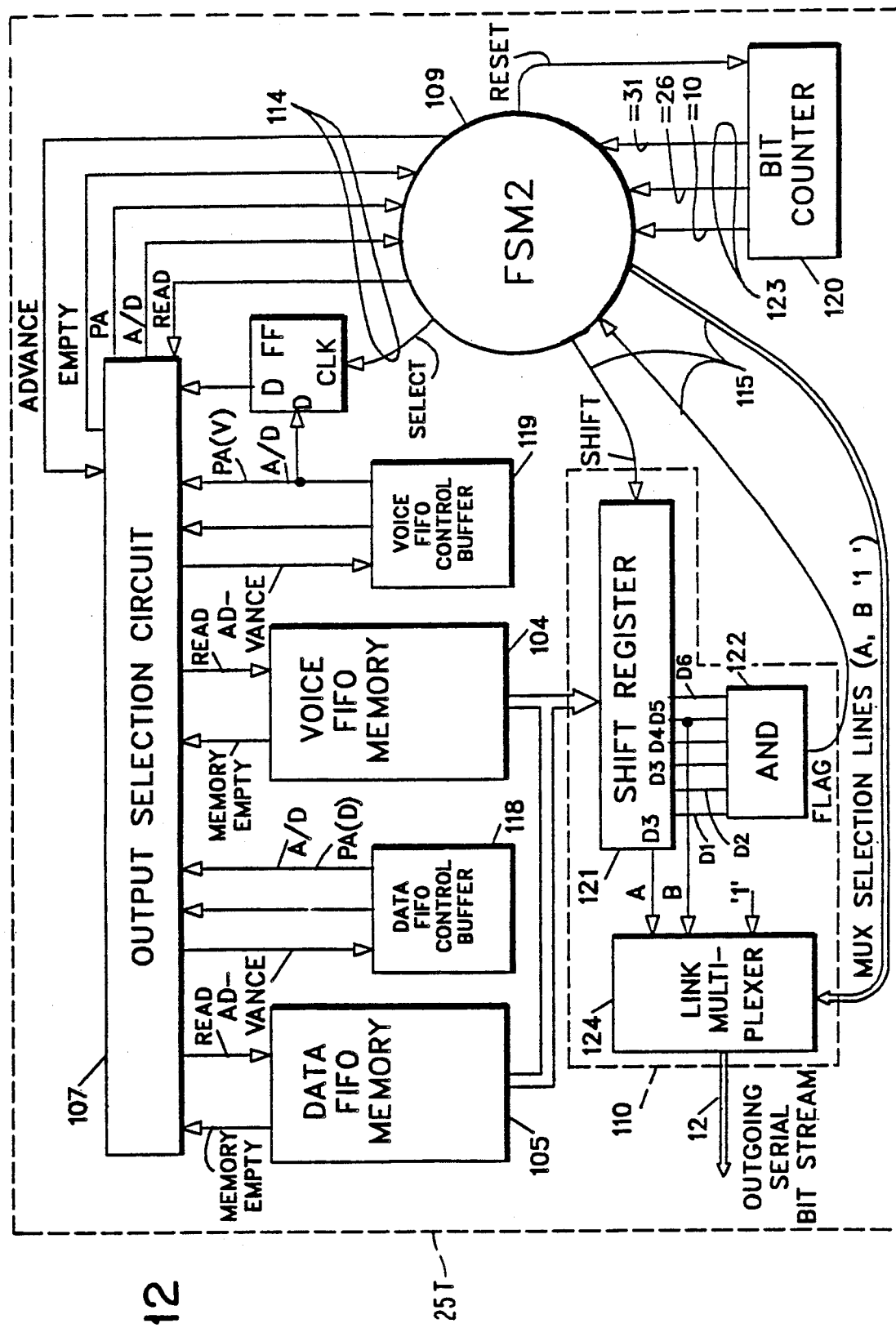
FIG. 12 is a more detailed schematic illustration of the transmitter adapter of FIG. 10 as it relates to finite state control circuit FSM2.

In FIG. 12 more details of the portions of the transmitter that relate to FSM2 109 are depicted. FSM2 is implemented in a standard PAL. We now describe the actions taken by FSM2. Let's assume that FSM2 has either just ended the transmission of a previous packet or has not transmitted a packet for a long time. This implies that FSM2 selects the input '1' for the output selection logic circuit 107. Whenever FSM2 detects (from the control buffer) that a packet is waiting in one of the FIFO memories 103 or 104 it activates the select line which causes the output selection circuit to select either a voice or data FIFO memory and one either a voice or data control buffer 117 or 118 by giving a priority to the voice part. If this packet should be accepted according to the corresponding accept/discard line the following steps are performed. The first word is latched from the memory into the shift register 121. A flag is identified by AND gate 122. If this word contains a flag, the next word is immediately latched from the memory into the shift register. At this point FSM2 selects the A output of the shift register and starts shifting it. After 11 bits were transmitted on the output link 12, the FSM2 selects the output B of the shift register by using the MUX selection lines (A, B, or '1') which are inputs to the link multiplexor 124. This change in the selection strips off the used SID (say, this is 5 bits long) from the serial outgoing bit stream. After a total of 27 subsequent link clock cycles have elapsed FSM1 latches a new word from the memory into the shift register. From this point until a flag is detected FSM2 shifts the shift register, selects the output A, and reads the memory every 32 clock cycles. When the flag is detected FSM1 advance the control buffer, selects the '1' output and repeats this procedure. Whenever the control buffer tells FSM2 to discard a packet, FSM2 keeps latching words from the memory into the shift register until a flag is detected. Through all this procedure the output '1' is selected. The numbers =10, =26 and =31 on line 23 extending from the bit counter 20 identify the counts of the counter for the purpose of stripping off the SID's (link addresses) as the packet is transmitted from the nodes of the network.

Figure 13:
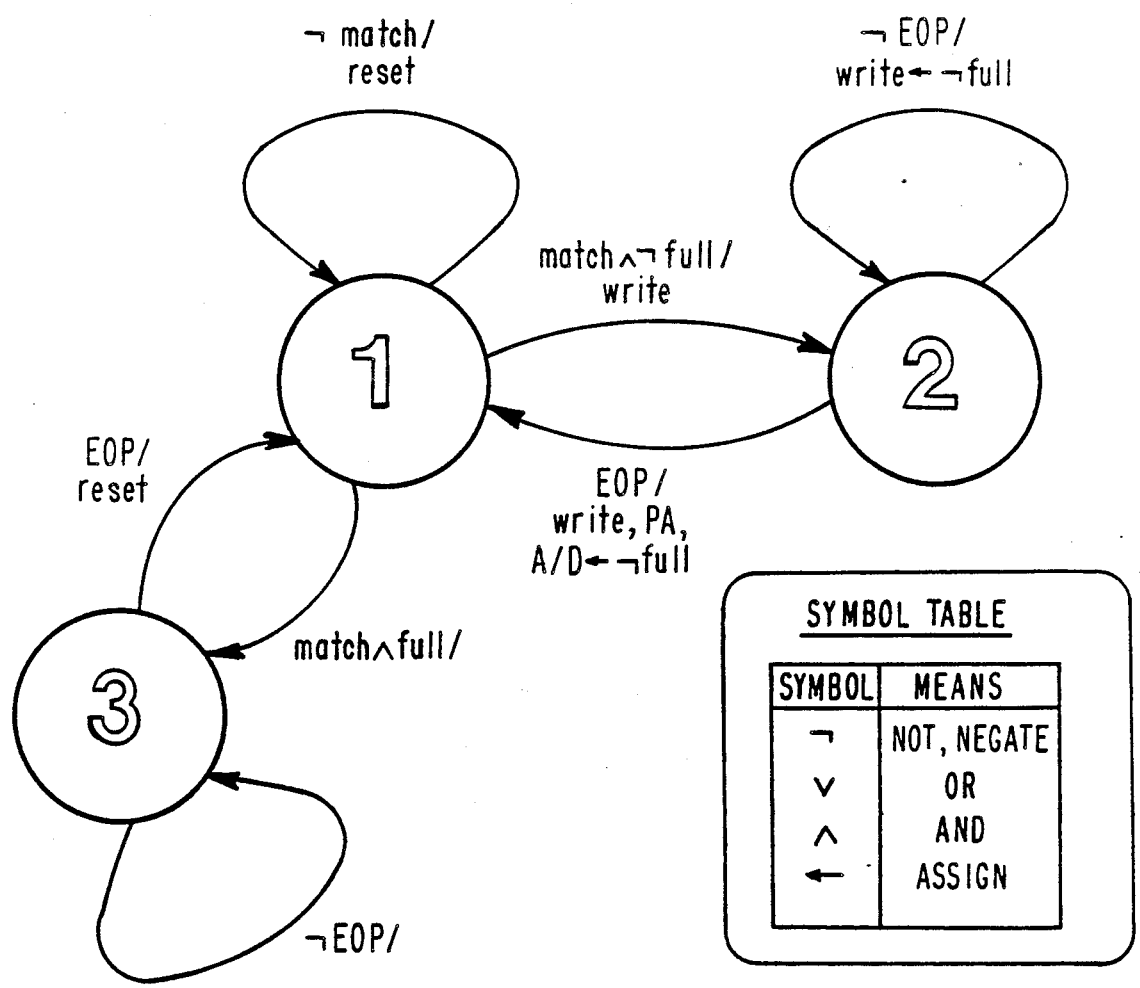
FIG. 13 shows the state diagram for transmitter FSM1.
Figure 14:
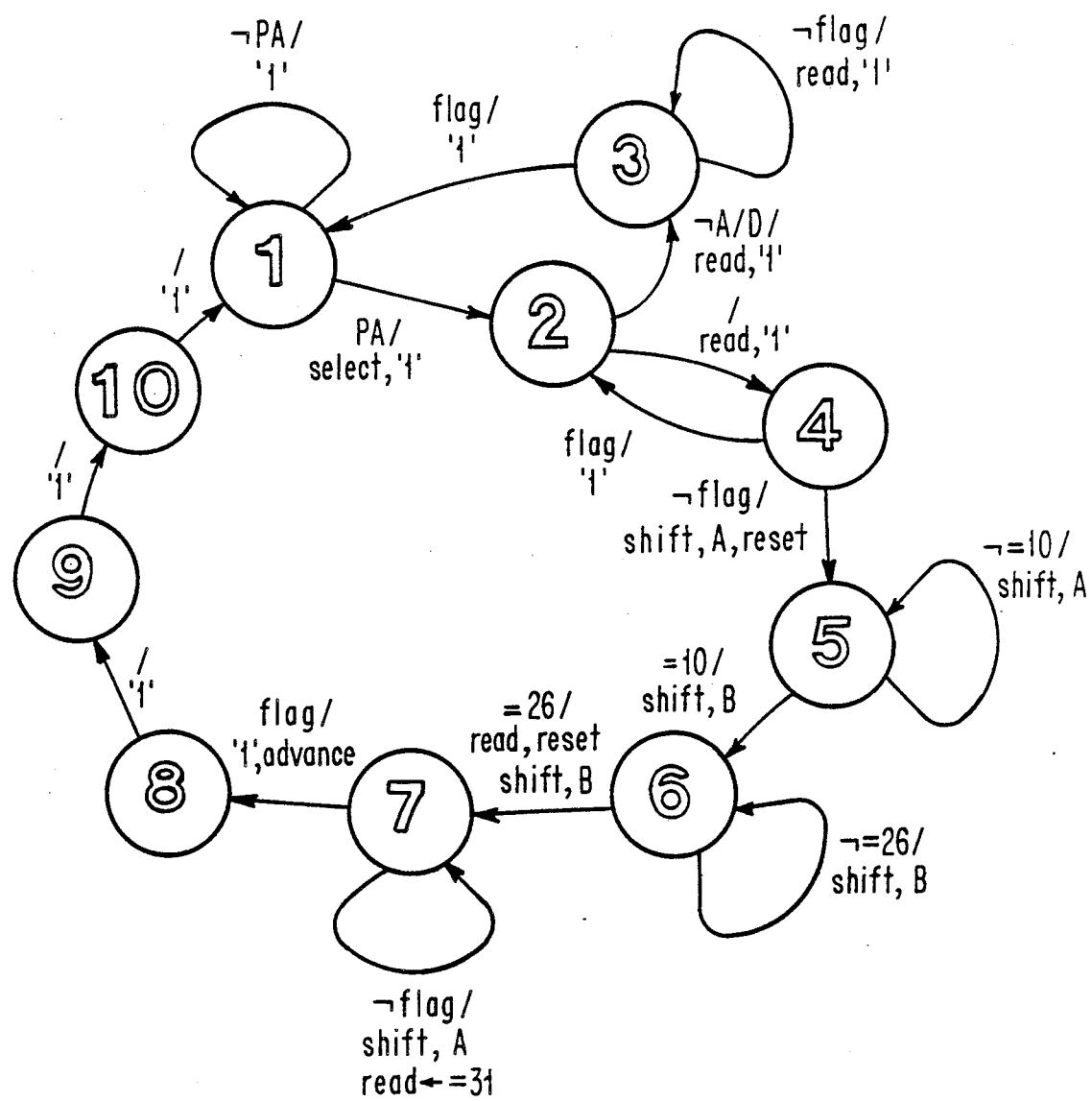
FIG. 14 is a schematic illustration of the state diagram for transmitter FSM2.
Figure 15:
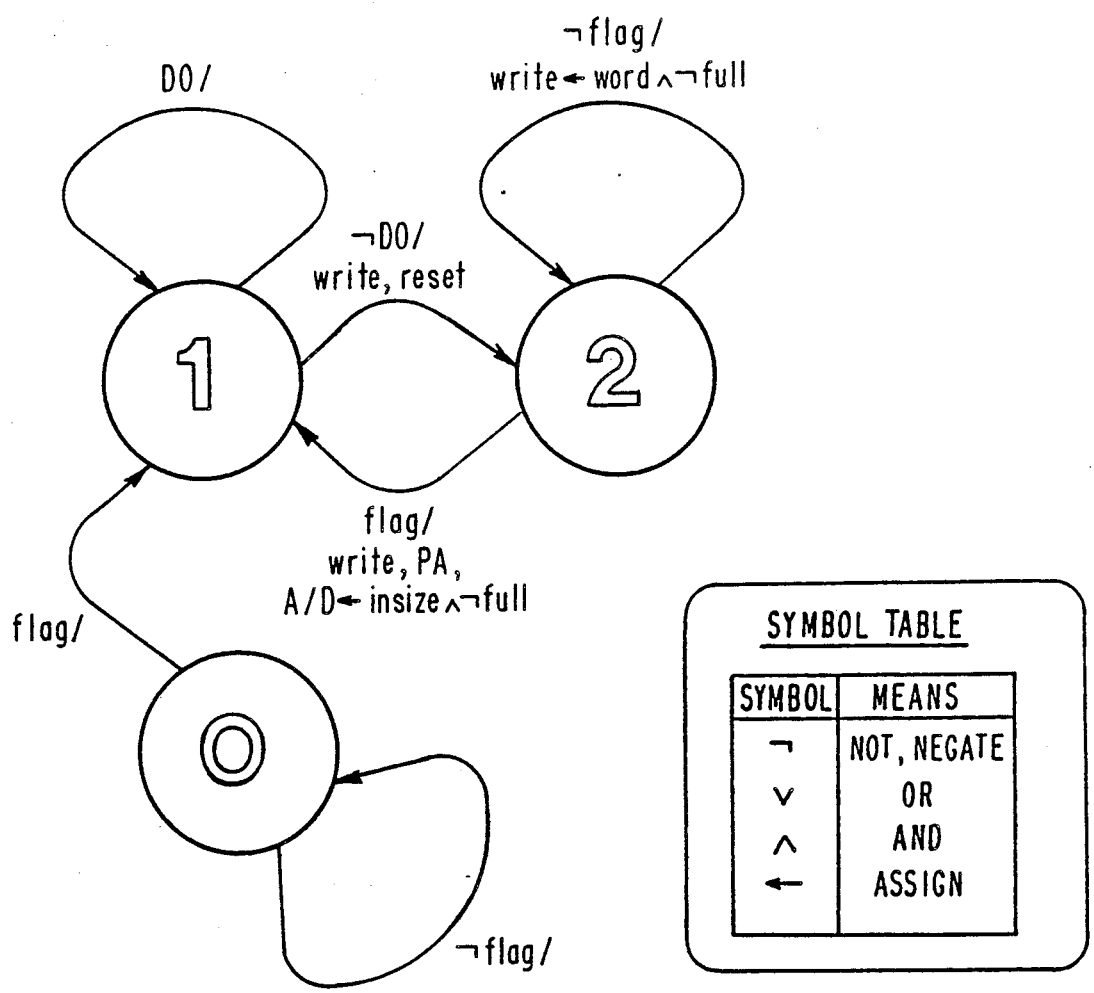
FIG. 15 is the state diagram for the receiver FSM1.
Figure 16:
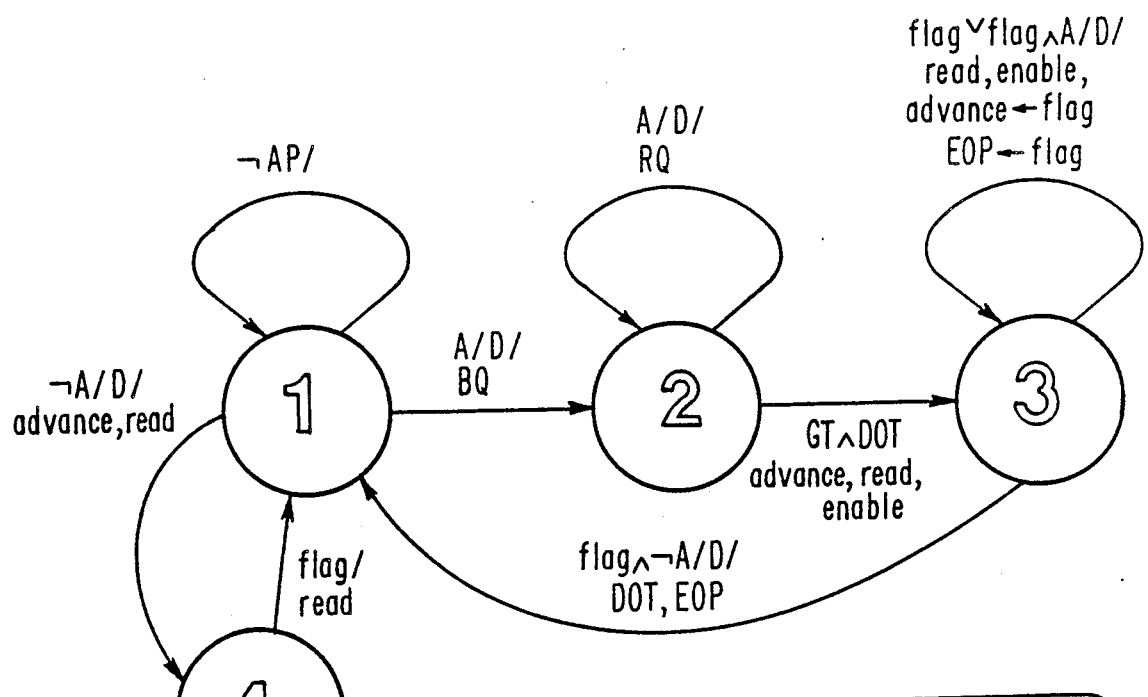
FIG. 16 is the state diagram for the receiver FSM2.

To complete the description of the transmitter, the state diagrams of FSM1 and FSM2 are given in FIGS. 13–16. FIGS. 13 and 14 are the state diagrams for the receiver FSM1 and the receiver FSM2 respectively. FIGS. 15 and 16 are the state diagrams for the transmitter FSM1 and the transmitter for FSM2 respectively.

Figure 17:
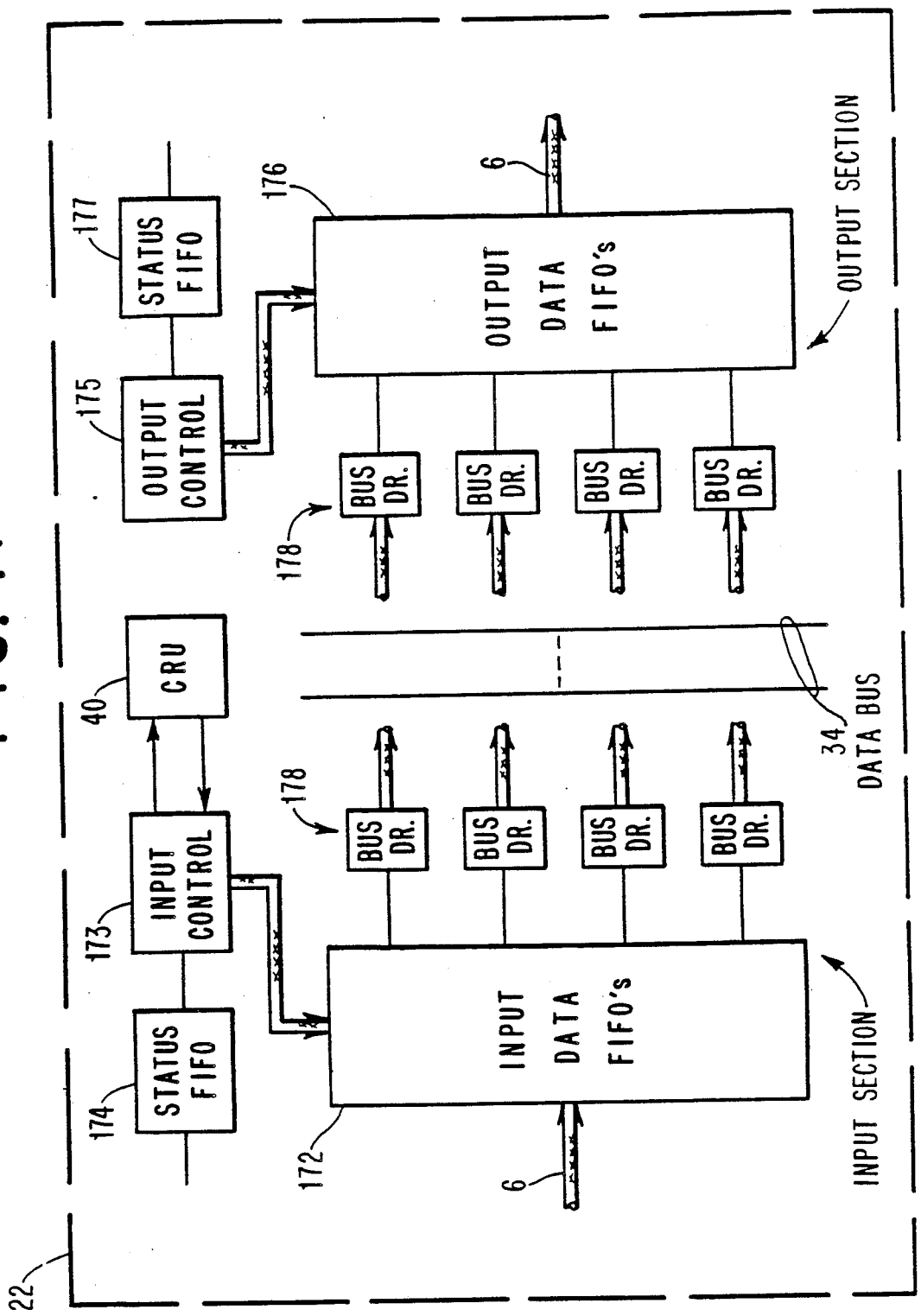
FIG. 17 is a schematic illustration of the network control adapter of FIG. 2.

Referring to FIG. 17, the NCU is connected to the switching subsystem through a 176 adaptor 22 that is very similar to the link adapter. The network control adapter is basically the same as the link adapter 25R and 25T of FIG. 3. The input and output data FIFOs 172 and 176 are mapped directly into the memory address space of NCU bus 6, (in this case the PS2 bus). Thus, the NCU can read/write directly to these data FIFO's. Also shown are bus drivers 178 which serve as an interface between the data FIFOs and the bus 34. The connections from the network control adapter to the CRU 40 are similar to the connections from the link adapters to the CRU. In fact, the network control adapters can be considered as one of the link adapters of FIG. 5.

The NCU sends a packet by writing the packet into the input data FIFO's 172, and then it signals the input control 173 by writing a single word in the status FIFO 174. The input control is responsible for getting access to the bus and for reading the packet onto the bus similar to FSM2 in the link adaptor.

A received packet from the bus 34 is written into the output data FIFO 176 by the output control 175 that is similar to FSM3 of the link adaptor. Once a complete packet is received, a word is written into the status FIFO 177 to indicate this event to the NCU. The NCU reads this packet directly from the output data FIFOs that are mapped into its bus address space.

Having thus described our invention, what we claim as new and desire to secure by Letters Patent is:

1. A method of transmitting variable size packets on a parallel communication bus from a FIFO memory of a source adapter to a FIFO memory of a selected destination adapter, said method for each packet of said packets comprising the steps of:
   (a) reading said packet, having at least two words therein, from said FIFO memory of said source adapter onto a bus with one word being transmitted on said bus during only one clock cycle, with all words of said packet being transmitted in consecutive clock cycles, with a link address of said packet appearing in a designated word of said packet that is transmitted on said bus and with only one packet being transmitted on said bus at any time, each of said words being large enough so as to contain a complete address, with only one said source adapter having control of said bus at any time, said one source adapter having control of said bus for the duration of one or more full packets being transmitted on said bus;
   (b) identifying a first word and a last word of said packet to identify boundaries of said packet; and
   (c) comparing, in one clock cycle, said link address in said designated word of said packet with link addresses in all adapters capable of accessing said bus, and writing words of said packet, from said first word to said last word, in FIFO memories of said all adapters whose link addresses match said link address in said designated word.

2. A method as recited in claim 1, wherein said designated word is said first word of said packet that is transmitted on said bus.

3. A method of switching variable size packets between asynchronous read/write FIFO memories of adapters, each of said adapters having access to a parallel communications bus, said method comprising the steps of:
   (a) storing each of said packets into a FIFO memory of said memories of a source adapter of said adapters;
   (b) for each source adapter of said adapters, reading packets from a corresponding FIFO memory of said memories onto said bus with one word being transmitted on said bus during only one bus clock cycle, with all words of the packet being transmitted on said bus in consecutive bus cycles, with at least one link address being stored in at least one designated word of said packet and with only one of said packets being transmitted on said bus at any time, each of said words being large enough so as to contain a complete link address, with only one of said adapters having control of said bus at any time, said one adapter having control of said bus for the duration of one or more full packets being transmitted on said bus;

(c) for each packet read on said bus, identifying a first and last word of each packet to identify the boundaries of each packet said first and last words being identified by corresponding flags;

(d) for each of said packets read on said bus, comparing in one bus block cycle a corresponding said link address in a corresponding said designated word of said each packet with link addresses in said adapters; and (e) for each of said packets read on said bus, writing said each packet in each of said FIFO memories of said adapters where link addresses match said link address in said designated word of said each packet.

* * * * *